United States Patent
Iwai et al.

(10) Patent No.: US 8,379,591 B2
(45) Date of Patent: Feb. 19, 2013

(54) SEQUENTIAL TRANSMISSION METHOD

(75) Inventors: Takashi Iwai, Ishikawa (JP); Daichi Imamura, Kanagawa (JP); Tomofumi Takata, Ishikawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 12/744,663

(22) PCT Filed: Nov. 28, 2008

(86) PCT No.: PCT/JP2008/003528
§ 371 (c)(1),
(2), (4) Date: May 25, 2010

(87) PCT Pub. No.: WO2009/069315
PCT Pub. Date: Jun. 4, 2009

(65) Prior Publication Data
US 2010/0265814 A1 Oct. 21, 2010

(30) Foreign Application Priority Data
Nov. 30, 2007 (JP) .................. 2007-311650

(51) Int. Cl.
*H04W 4/00* (2009.01)
(52) U.S. Cl. ...................................... 370/330
(58) Field of Classification Search .......... 370/310–349, 370/464, 465, 468, 478, 479, 480
See application file for complete search history.

(56) References Cited

U.S. PATENT DOCUMENTS
2007/0253465 A1 * 11/2007 Muharemovic et al. ...... 375/130

OTHER PUBLICATIONS

International Search Report dated Feb. 24, 2009.
3GPP TSG RAN WG1 meeting #47bis, R1-070367, "Sequence Allocation Method for E-UTRA Uplink Reference Signal," Huawei, Jan. 2007, 3 pages.
3GPP TSG RAN WG1 #48bis, R1-071542, "Binding method for UL RS sequence with different lengths," LG Electronics, Mar. 2007, p. 1-4.
3GPP TSG RAN WG1 Meeting #50, R1-073518, "Sequence Grouping Rule for UL DM RS," Huawei, Aug. 2007, 6 pages.
3GPP TSG RAN WG1 Meeting #50bis, R1-074397, "Further consideration on uplink RS hopping and grouping," Panasonic, Oct. 2007, p. 1-8.
3GPP TSG RAN WG1 Meeting #51, R1-074614, "Sequence Grouping Method for UL RS," Huawei, Nov. 2007, 3 pages.
3GPP TSG RAN Meeting #51bis, R1-080145, "RS sequence grouping for E-UTRA uplink," Panasonic, Jan. 2008, p. 1-5.

* cited by examiner

*Primary Examiner* — Jeffrey M Rutkowski
*Assistant Examiner* — Juvena Loo
(74) *Attorney, Agent, or Firm* — Dickinson Wright PLLC

(57) ABSTRACT

Provided is a sequential allocation method which can reduce mutual correlation between different sequential groups while maintaining a number of sequential groups. ST101 sets a sequence length Nb=31 corresponding to an RB number m=3 and a sequence number ub=1. In a first bandwidth from 3RB to 5RB, ST 105 selects a ZC sequence in which a difference from ub/Nb is u/N which is the nearest to 0. In a second bandwidth of 6RB or above, ST106 selects a plurality of sequences in which the difference from ub/Nb is u/N which is near to 0 and 0.5.

12 Claims, 15 Drawing Sheets

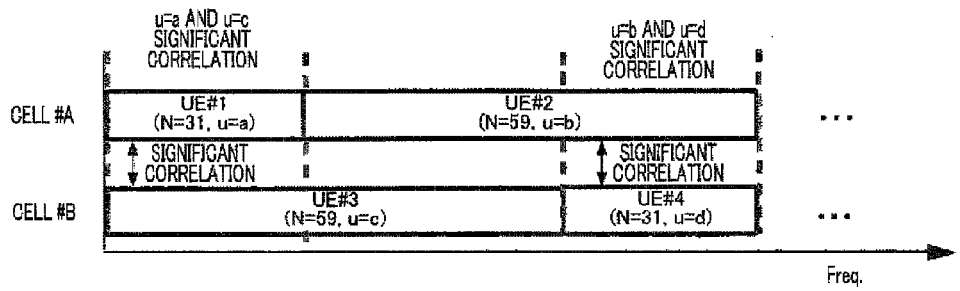
FIG.2
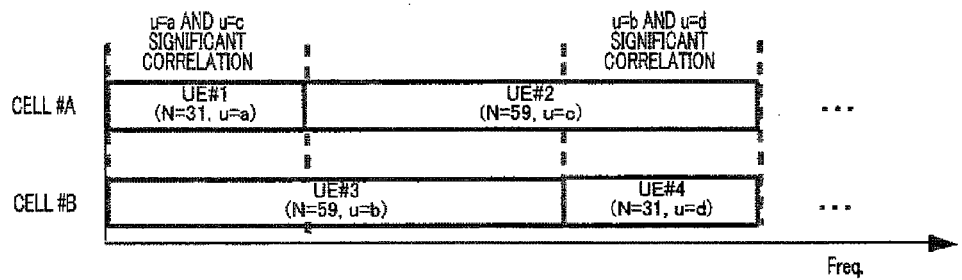
FIG.3
| | GROUP #1 | GROUP #2 | .. | GROUP #30 |
|---|---|---|---|---|
| RB#3 (N=31) | 1 | 2 | | 30 |
| RB#4 (N=47) | 2 | 3 | | 45 |
| . | . | . | | . |
| . | . | . | | . |
| . | . | . | | . |
| RB#20 (N=239) | 5 6 ·· 10 11 | 12 13 ·· 17 18 | | 229 230 ·· 234 235 |
FIG.4

|  | GROUP #1 | GROUP #2 | ... | GROUP #15 |
|---|---|---|---|---|
| RB#3 (N=31) | 1 16 | 2 17 | | 15 30 |
| RB#4 (N=47) | 2 25 | 3 27 | | 21 45 |
| ... | | ... | | |
| RB#20 (N=239) | 5 6 ·· 10 11<br>125 126 ·· 130 131 | 12 13 ·· 17 18<br>132 133 ·· 137 138 | | 109 110 ·· 113 114<br>229 230 ·· 233 234 |

FIG.6

| | GROUP #1 | GROUP #2 | GROUP #3 | ... | GROUP #16 | ... | GROUP #28 | GROUP #29 | GROUP #30 |
|---|---|---|---|---|---|---|---|---|---|
| RB#3(N=31) | 1 | 2 | 3 | | 16 | | 28 | 29 | 30 |
| RB#4(N=47) | 2 | 3 | 5 | | 25 | | 19 | 44 | 45 |
| RB#5(N=59) | 2 | 4 | 6 | | 32 | | 53 | 55 | 57 |
| RB#6(N=71) | 2 38 | 5 40 | 7 42 | | 1 37 | | 29 64 | 31 66 | 33 69 |
| RB#8(N=89) | 3 47 48 | 6 50 | 8 9 53 | | 12 46 | | 36 80 81 | 39 83 | 41 42 86 |
| RB#9(N=107) | 3 4 57 | 7 60 61 | 10 11 63 64 | | 1 2 55 56 | | 43 44 96 97 | 46 47 100 | 50 103 104 |
| RB#10(N=113) | 3 4 60 61 | 7 8 63 64 | 11 67 68 | | 1 2 58 59 | | 45 46 102 | 49 50 105 106 | 52 53 109 110 |
| RB#12(N=139) | 4 5 73 74 75 | 8 9 10 78 79 | 13 14 82 83 84 | | 2 3 71 72 | | 55 56 57 125 126 | 60 61 129 130 131 | 64 65 66 134 135 |
| ... | | | | | | | | | |
| RB#20(N=239) | 6 7 8 9<br>126 127 128 129 | 14 15 16 17<br>133 134 135 136 | 22 23 24 25<br>141 142 143 144 | | 2 3 4 5<br>122 123 124 125 | | 95 96 97 98<br>214 215 216 217 | 103 104 105 106<br>222 223 224 225 | 110 111 112 113<br>230 231 232 233 |

FIG.10

| | GROUP #1 | GROUP #2 | GROUP #3 | ... | GROUP #16 | ... | GROUP #28 | GROUP #29 | GROUP #30 |
|---|---|---|---|---|---|---|---|---|---|
| RB#3 (N=31) | 1 | 2 | 3 | | 16 | | 28 | 29 | 30 |
| RB#4 (N=47) | 2 | 3 | 5 | | 24 | | 42 | 44 | 45 |
| RB#5 (N=59) | 2 | 4 | 6 | | 30 | | 53 | 55 | 57 |
| RB#6 (N=71) | 2 38 | 5 40 | 7 42 | | 1 37 | | 29 64 | 31 66 | 33 69 |
| RB#8 (N=89) | 3 47 | 6 50 | 9 53 | | 1 46 | | 36 80 | 39 83 | 42 86 |
| RB#9 (N=107) | 3 57 | 7 60 | 10 64 | | 2 55 | | 43 97 | 47 100 | 50 104 |
| RB#10 (N=113) | 4 60 | 7 64 | 11 67 | | 2 58 | | 46 102 | 49 106 | 53 109 |
| RB#12 (N=139) | 4 5 73 74 | 8 9 78 79 | 13 14 82 83 | | 2 3 71 72 | | 56 57 125 126 | 60 61 130 131 | 65 66 134 135 |
| RB#15 (N=179) | 5 6 95 96 | 11 12 101 102 | 17 18 106 107 | | 2 3 92 93 | | 72 73 161 162 | 77 78 167 168 | 83 84 173 174 |
| RB#16 (N=191) | 6 7 101 102 | 12 13 107 108 | 18 19 113 114 | | 3 4 98 99 | | 77 78 172 173 | 83 84 178 179 | 89 90 184 185 |
| RB#18 (N=211) | 6 7 112 113 | 13 14 119 120 | 20 21 125 126 | | 3 4 108 109 | | 85 86 190 191 | 91 92 197 198 | 98 99 204 205 |
| RB#20 (N=239) | 7 8 127 128 | 15 16 134 135 | 23 24 142 143 | | 3 4 123 124 | | 96 97 215 216 | 104 105 223 224 | 111 112 231 232 |

FIG.15

SEQUENTIAL TRANSMISSION METHOD

TECHNICAL FIELD

The present invention relates to a sequence transmission method that selects and transmits CAZAC (Constant Amplitude and Zero Auto-correlation Code) including Zadoff-Chu sequences (hereinafter "ZC sequences") and sequences according to CAZAC sequences.

BACKGROUND ART

In 3GPP LTE (3rd Generation Partnership Project Long Term Evolution), a ZC sequence is employed as an RS (reference signal) used in uplink. The reasons a ZC sequence is employed as an RS include constant frequency performance, good auto-correlation performance, good cross-correlation performance, and so on. A ZC sequence is a kind of a CAZAC sequence (Constant Amplitude and Zero Auto-correlation Code) and represented by following equation 1 or 2.

(Equation 1)

$$a_r(k) = \begin{cases} e^{-j\frac{2\pi u}{N}(k^2/2+qk)}, & N\colon \text{even} \\ e^{-j\frac{2\pi u}{N}(k(k+1)/2+qk)}, & N\colon \text{odd} \end{cases} \quad [1]$$

(Equation 2)

$$a_r(k) = \begin{cases} e^{j\frac{2\pi u}{N}(k^2/2+qk)}, & N\colon \text{even} \\ e^{j\frac{2\pi u}{N}(k(k+1)/2+qk)}, & N\colon \text{odd} \end{cases} \quad [2]$$

In equations 1 and 2, N is the sequence length and u is the ZC sequence index, and N and u are coprime. Further, q is an arbitrary integer.

Generally, N−1 quasi-orthogonal sequences with good cross-correlation characteristics can be generated from a ZC sequence of sequence length N of a prime number. In this case, the cross-correlation between generated N−1 quasi-orthogonal sequences is constant at √N.

Amongst RSs used in uplink, a reference signal for channel estimation used to demodulate data (hereinafter "DM-RS," which stands for demodulation reference signal) is transmitted in the same band as the data transmission bandwidth. That is, when the data transmission bandwidth is narrow, a DM-RS is transmitted in a narrow band, and, when the data transmission bandwidth is wide, a DM-RS is transmitted in a wide band. For example, if the data transmission bandwidth is one RB (resource block), the DM-RS transmission bandwidth is also one RB, and, if the data transmission bandwidth is two RBs, the DM-RS transmission bandwidth is also two RBs.

In 3GPP LTE, one RB is formed with twelve subcarriers, so that the number of subcarriers forming a transmission bandwidth is an integral multiple of twelve. Further, 3GPP LTE determines to use ZC sequences in a transmission bandwidth of 3 RBs or more. Based on this, a DM-RS transmitted in 3 RBs uses a ZC sequence of sequence length N of 31, and a DM-RS transmitted in 4 RBs uses a ZC sequence of sequence length N of 47. Then, the ZC sequence of sequence length N of 31 and the ZC sequence of sequence length N of 47 are individually subjected to cyclic extension (i.e. forward data of the sequences is copied and attached to the rear of the sequences), to generate DM-RSs having 36 subcarriers and 48 subcarriers.

As the method of ZC sequence allocation, by allocating ZC sequences with different sequence indices as DM-RSs in RBs, interference between DM-RSs used in different cells, that is, reduce inter-cell interference between DM-RSs is reduced. The data transmission bandwidth is determined based on scheduling of cells, so that DM-RSs in different transmission bandwidths are multiplexed between cells. When ZC sequences in different transmission bandwidths, that is, ZC sequences with different sequence lengths, are multiplexed, cross-correlation increases in a given combination of ZC sequence indices.

FIG. 1 shows cross-correlation characteristics between ZC sequences in different combinations of sequence indices. To be more specific, FIG. 1 shows cross-correlation characteristics between ZC sequence of sequence length N=31 and sequence index u=1 and ZC sequences of sequence length N=59 and sequence indices u=1 to 6. In FIG. 1, the horizontal axis shows delay time using the number of symbols, the lateral axis shows a normalized cross-correlation value (the value obtained by dividing a cross-correlation value by signal energy). As shown in FIG. 1, in the combination of the ZC sequence of N=31 and u=1 and the ZC sequence of N=59 and u=2, the maximum cross-correlation value increases significantly, and the cross-correlation value is about five times the cross-correlation value in the same transmission bandwidth, 1/√N, that is, 1/√31.

FIG. 2 shows inter-cell interference of DM-RSs when specific ZC sequence combinations of significant cross-correlation are allocated to neighboring cells. Specifically, a ZC sequence of N=31 and u=a and a ZC sequence of N=59 and u=b are allocated to cell #A and a ZC sequence of N=59 and u=c and a ZC sequence of N=31 and a=d are allocated to cell #B. In this case, by the combination of the ZC sequence of N=31 and u=a allocated to cell #A and the ZC sequence of N=59 and u=c allocated to cell #B, or by the combination of the ZC sequence of N=59 and u=c and the ZC sequence of N=31 and u=d allocated to cell #B, inter-cell interference of DM-RSs increases, the accuracy of channel estimation deteriorates, and therefore the performance of data demodulation significantly deteriorates.

Then, in cellular radio communication systems, the method of ZC sequence allocation disclosed in Non-Patent Document 1 is employed. Non-Patent Document 1 proposes allocating a combination of ZC sequences with significant cross-correlation and with different sequence lengths, to the same cell, in order to reduce inter-cell interference.

FIG. 3 illustrates the method of ZC sequence allocation disclosed in Non-Patent Documents 1 and 2. FIG. 3 uses an example shown in FIG. 2. As shown in FIG. 3, one combination of ZC sequences of significant cross-correlation, that is, the combination of a ZC sequence of N=31 and u=a and a ZC sequence of N=59 and u=c is allocated to the same cell (here, cell #A). Further, the other combination of ZC sequences of significant cross-correlation, that is, the combination of a ZC sequence with N=31 and a=d and the ZC sequence with N=59 and u=b is allocated to the same cell (here, cell #B). In a cell, one base station schedules transmission bands, and therefore, ZC sequences of significant cross-correlation allocated to the same cell are not multiplexed. Consequently, inter-cell interference is reduced.

Further, Non-Patent Document 2 proposes a method of finding groups of ZC sequence indices (hereinafter "sequence groups") used in RBs. A ZC sequence has one characteristic of having higher cross-correlation when the difference in u/N is smaller. Then, the ZC sequences showing the difference in u/N equal to or less than a predetermined threshold value are found with reference to a sequence of given RBs (e.g. 3 RBs), from ZC sequences in RBs, and a plurality of ZC sequences as one sequence group are allocated to a cell.

According to the method of sequence group generation disclosed in Non-Patent Document 2, first, sequence length Nb and sequence index ub as a reference are set. Hereinafter, a ZC sequence with reference sequence length Nb and reference sequence index ub is referred to as a "reference sequence." If Nb=31 (the sequence length corresponding to 3 RBs) and ub=1 (arbitrarily selected from 1 to Nb−1), ub/Nb=1/31. Next, ZC sequences showing the difference from reference ub/Nb in u/N equal to or less than a predetermined threshold value are found from ZC sequences in each RB, to generate a sequence group. Further, other sequence groups are generated in the same steps by changing a sequence index as the reference. In this way, it is possible to generate sequence groups equaling the number of sequence indices as references, that is, generate Nb−1 different sequence groups.

Here, assuming that the ZC sequences showing the difference from ub/Nb equal to or less than the predetermined threshold value overlap between neighboring sequence groups, the same ZC sequences are included in a plurality of sequence groups, and sequence indices collide between cells. Then, to prevent ZC sequences in neighboring sequence groups from overlapping, the above predetermined threshold value is set up with a smaller value than 1/(2Nb), for example.

FIG. 4 shows sequence groups generated by the method of sequence group generation disclosed in Non-Patent Document 2. Here, sequence length N is set up smaller than the size that can be transmitted in the transmission bandwidth and is set up the closest prime number to this size, and is uniquely found from the number of RBs. FIG. 4 shows sequence groups formed with ZC sequences satisfying following equation 3 in a case where the reference sequence length is Nb=31 and reference sequence indices are ub=1 to 30. In equation 3, threshold value Xth is, for example, Xth=1/(2Nb)=1/62 so that the same sequence is not included in a plurality of sequence groups.

$$|ub/Nb - u/N| = Xth \quad \text{(Equation 3)}$$

Further, Non-Patent Document 3 discloses the relationships between the differences in u/N between ZC sequences and cross-correlation values of those ZC sequences, as shown in FIG. 5. FIG. 5 shows that, when the difference in u/N is close to 0, cross-correlation between sequences becomes the greatest and when the difference in u/N is close to 0.5, the cross-correlation becomes the second greatest.

Non-Patent Document 1: Huawei, R1-070367, "Sequence Allocation Method for E-UTRA Uplink Reference Signal," 3GPP TSG RAN WG1 Meeting #47bis, Sorrento, Italy 15-19 January, 2007

Non-Patent Document 2: LG Electronics, R1-071542, "Binding method for UL RS sequence with different lengths," 3GPP TSG RAN WG1 Meeting #48bis, St. Julians Malta, Mar. 26-30, 2007

Non-Patent Document 3: Panasonic, R1-074397, "Further consideration on uplink RS hopping and grouping," 3GPP TSG RAN WG1 Meeting #50bis, Shanghai, China, Oct. 8-12, 2007

DISCLOSURE OF INVENTION

Problems to be Solved by the Invention

By improving the techniques disclosed in Non-Patent Documents 1 to 3, it is possible that the method of sequence group that generates a sequence group by selecting sequences showing the difference in u/N close to 0 and 0.5 and showing significant cross-correlation. FIG. 6 shows an example of sequence groups generated by the method of sequence group generation that improves the techniques disclosed in Non-Patent Documents 1 to 3. When sequence group index=1 (group #1) is explained as an example, reference sequence length Nb=31 and reference sequence index ub=1. Then, the sequences showing the difference from ub/Nb close to 0, that is, a sequence of u=2 in RB #4 (N=47) and a sequence of u=5 to 11 in RB #20 (N=239) are included in one group (group #1). Further, the sequences showing the difference from ub/Nb close to 0.5, that is, u=16 in RB #3 (N=31), u=25 in RB #4 (N=47), and u=125 to 131 in RB #20 (N=239) are included in one group (group #1). By this means, it is possible to prevent sequence groups showing the difference in u/N close to 0 and 0.5 from being allocated to neighboring cells and prevent the occurrence of significant cross-correlation.

However, as can be seen from the comparison between FIG. 4 and FIG. 6, with this method of sequence group generation, one sequence cannot overlap in a plurality of sequence groups, and therefore the number of sequence groups that can be generated by including sequences showing the difference in u/N close to 0 and 0.5 in the same sequence group, decreases by half. Even when sequences showing the difference in u/N becomes closest to 0 and 0.5, the number of ZC sequences is small in small RBs, and therefore the number of groups that can be generated decreases. When the number of groups decreases, the distance between cells using the same sequence groups becomes short, and therefore interference from other cells increases.

It is therefore an object of the present invention to provide a sequence transmission method that reduces cross-correlation between different sequence groups while maintaining the number of sequence groups.

Means for Solving the Problem

The sequence transmission method of the present invention includes: a sequence selection step of selecting a Zadoff-Chu sequence from a group including a Zadoff-Chu sequence having (a sequence index)/(a sequence length) showing a difference from a reference Zadoff-Chu sequence having (the sequence index)/(the sequence length) close to 0, and a Zadoff-Chu sequence having (the sequence index)/(the sequence length) showing the difference from the reference Zadoff-Chu sequence having (the sequence index)/(the sequence length) close to 0.5; and a sequence transmission step of transmitting the selected Zadoff-Chu sequence.

Advantageous Effects of Invention

According to the present invention, it is possible to reduce cross-correlation between different sequence groups while maintaining the number of sequence groups.

BRIEF DESCRIPTION OF DRAWINGS

FIG. 2 shows inter-cell interference when specific combinations of ZC sequences are allocated to neighboring cells;

FIG. 3 illustrates to explain the method of ZC sequence allocation disclosed in Non-Patent Documents 1 and 2;

FIG. 4 shows sequence groups generated by the method of sequence group generation disclosed in Non-Patent Document 2;

FIG. 6 shows an example of sequence groups generated by a method of sequence group generation further improving Non-Patent Documents 1 to 3;

FIG. 10 shows sequence groups according to Embodiment 1 of the present invention;

FIG. 15 shows sequence groups according to Embodiment 2 of the present invention;

BEST MODE FOR CARRYING OUT THE INVENTION

Now, embodiments of the present invention will be described in detail with reference to the accompanying drawings.

Embodiment 1

Figure 1:
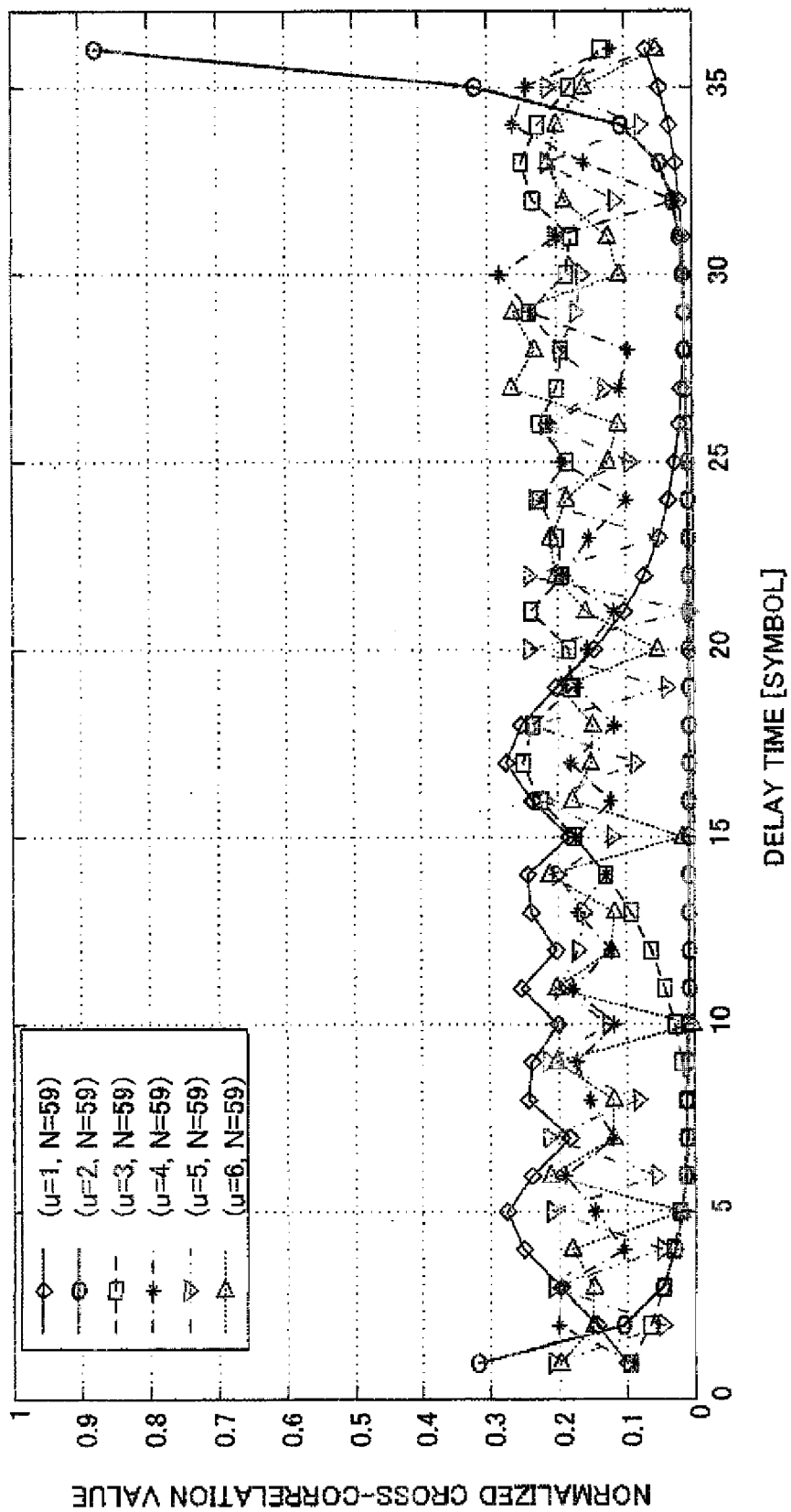
FIG. 1 shows cross-correlation characteristics between ZC sequences in combinations of different sequence indices.
Figure 5:
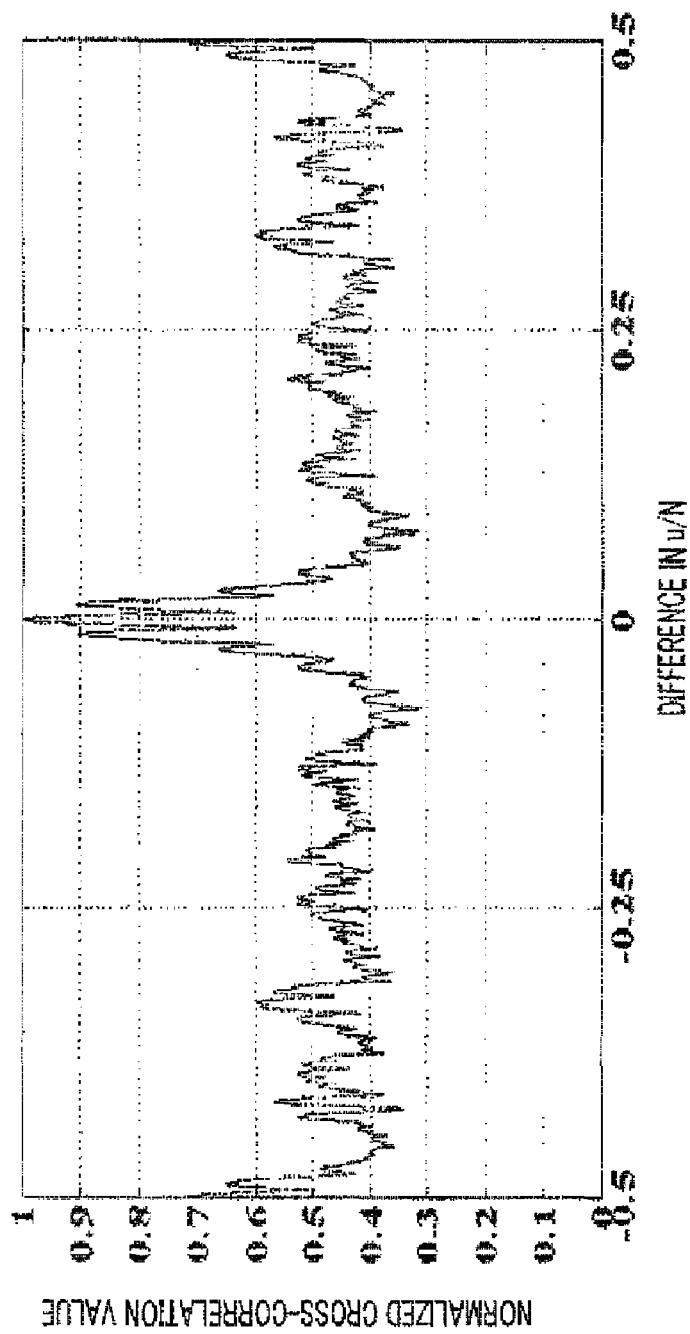
FIG. 5 shows relationships between differences in u/N between ZC sequences and cross-correlation values.
Figure 7:
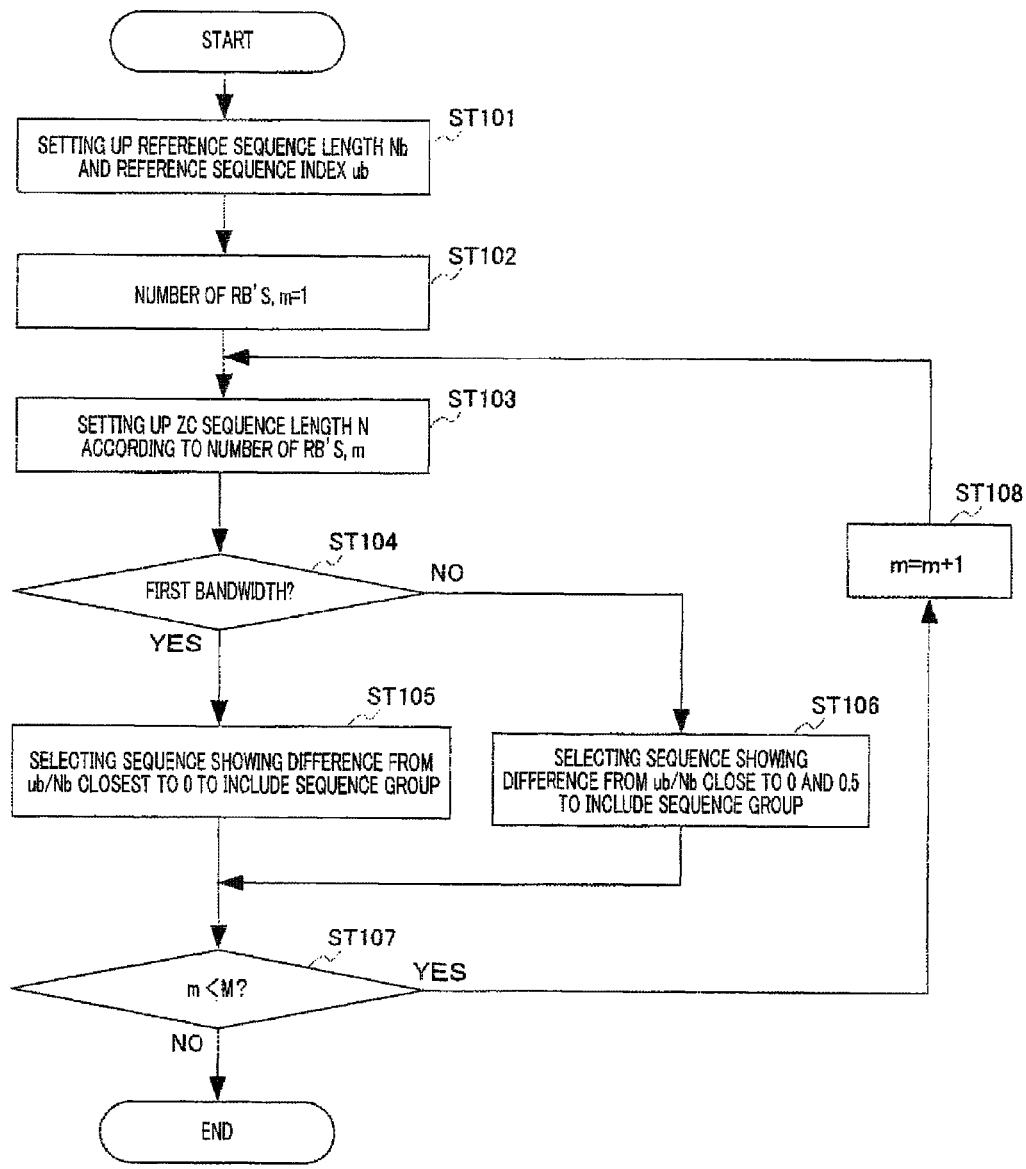
FIG. 7 is a flow chart of the method of sequence allocation according to Embodiment 1 of the present invention.

FIG. 7 is a flow chart showing the sequence allocation steps according to Embodiment 1 of the present invention. In FIG. 7, step (hereinafter "ST") 101 selects reference sequence length Nb and reference sequence index ub. Reference sequence index ub ranges from 1 to Nb−1 and corresponds to sequence group indices.

ST 102 initializes the number of RBs, m, to be 1, and ST 103 sets up ZC sequence length N according to the number of RBs, in. The number of RBs, m, and sequence length N associated uniquely, and, for example, N is smaller than the number of subcarriers that can be transmitted in m RBs, and is the closest prime number to the number of these subcarriers.

ST 104 decides whether or not m RBs are included in the first bandwidth. Here, a threshold value to divide between the first bandwidth and a second bandwidth is set in advance, and, when the number of RBs, m, is smaller than this threshold value, ST 104 decides that the number of RBs, m, is included in the first bandwidth. Further, when the number of RBs is greater than this threshold value, ST 104 decides that the RBs, are included in the second bandwidth. That is, the relationships are represented by equation 4.

$$\text{First bandwidth} < \text{Second bandwidth} \quad \text{(Equation 4)}$$

If ST 104 decides that RBs are included in the first bandwidth ("YES"), the step moves to ST 105, and, if ST 104 decides that the number of RBs belongs to the second bandwidth ("NO"), the step moves to ST 106.

ST 105 selects a sequence showing the difference from ub/Nb closest to 0, and includes the sequence in a sequence group. The step in ST 105 will be described later in detail.

ST 106 selects a plurality of sequences showing the difference from ub/Nb close to 0 and 0.5, and includes the sequences in a sequence group. The step in ST 106 will be described later in detail.

ST 107 decides whether or not m<M. Here, M is the maximum number of RBs in sequence group ub and corresponds to the maximum value of the transmission bandwidth. If ST 107 decides m<M holds ("YES"), the step moves to ST 108, and, if ST 107 decides m<M does not hold ("NO"), ST 107 stops generating a sequence group of sequence group index ub.

ST 108 increments the number of RBs, m, by one, like m=m+1.

Figure 8:
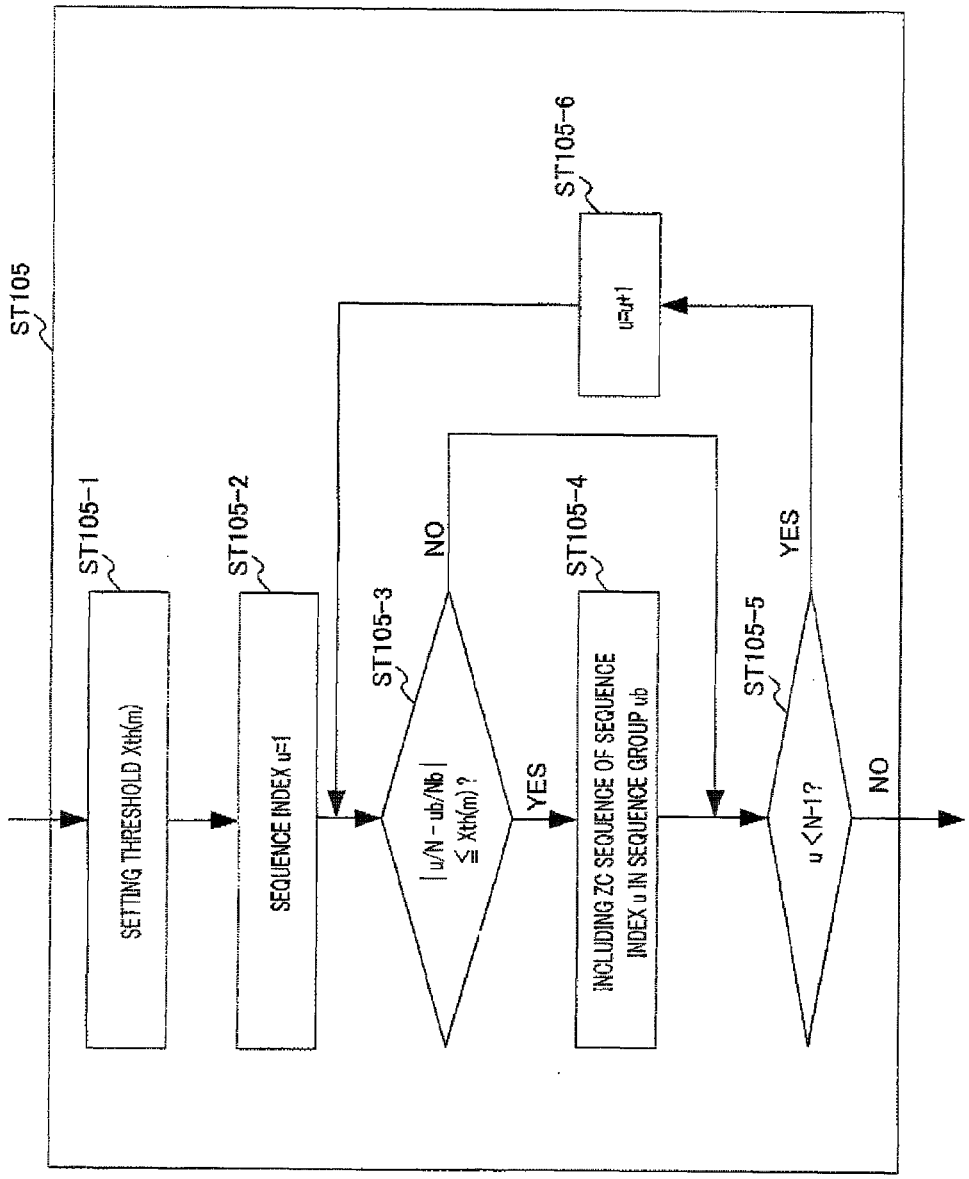
FIG. 8 is a flow chart showing a step of ST 105 in detail shown in FIG. 7.

Next, the steps in above-described ST 105 will be explained in detail using FIG. 8. In FIG. 8, ST 105-1 sets up threshold value Xth(m) corresponding to the number of RBs, The method of setting threshold value Xth(m) will be described later.

ST 105-2 initializes sequence index u to be 1, and, ST 105-3 decides whether or not u and N satisfies following equation 5.

$$|u/N - ub/Nb| = Xth(m) \quad \text{(Equation 5)}$$

In equation 5, threshold value Xth(m) is set such that only one sequence showing the difference from ub/Nb closest to 0 can be selected. For example, threshold value Xth(m) is set as in equation 6, where min(A,B) means the value of the smaller one of A and B.

$$Xth(m) = \min(1/(2Nb), 1/(2N)) \quad \text{(Equation 6)}$$

Here, equation 5 derives following equation 7. That is, equations 5 and 7 are equivalent, so that ST 105-3 may decide whether or not u and N fulfill equation 7.

$$(ub/Nb - Xth(m)) \times N = u = (ub/Nb + Xth(m)) \times N \quad \text{(Equation 7)}$$

If ST 105-3 decides that u and N satisfy equation 5 ("YES"), the step moves to ST 105-4, and if ST 105-3 decides that u and N do not satisfy equation 5 ("NO"), the step moves to ST 105-5.

ST 105-4 includes, as ZC sequences used in m RBs, ZC sequences with sequence index u, in sequence group ub, and ST 105-5 decides whether or not u<N−1 holds. If ST 105-5 decides u<N−1 holds ("YES"), the step moves to ST 105-6, and, if ST 105-3 decide u<N−1 does not hold ("NO"), the process of ST 105 is finished and the step moves to ST 107.

ST 105-6 increments sequence index u by one like u=u+1, and the step returns to ST 105-3.

Figure 9:
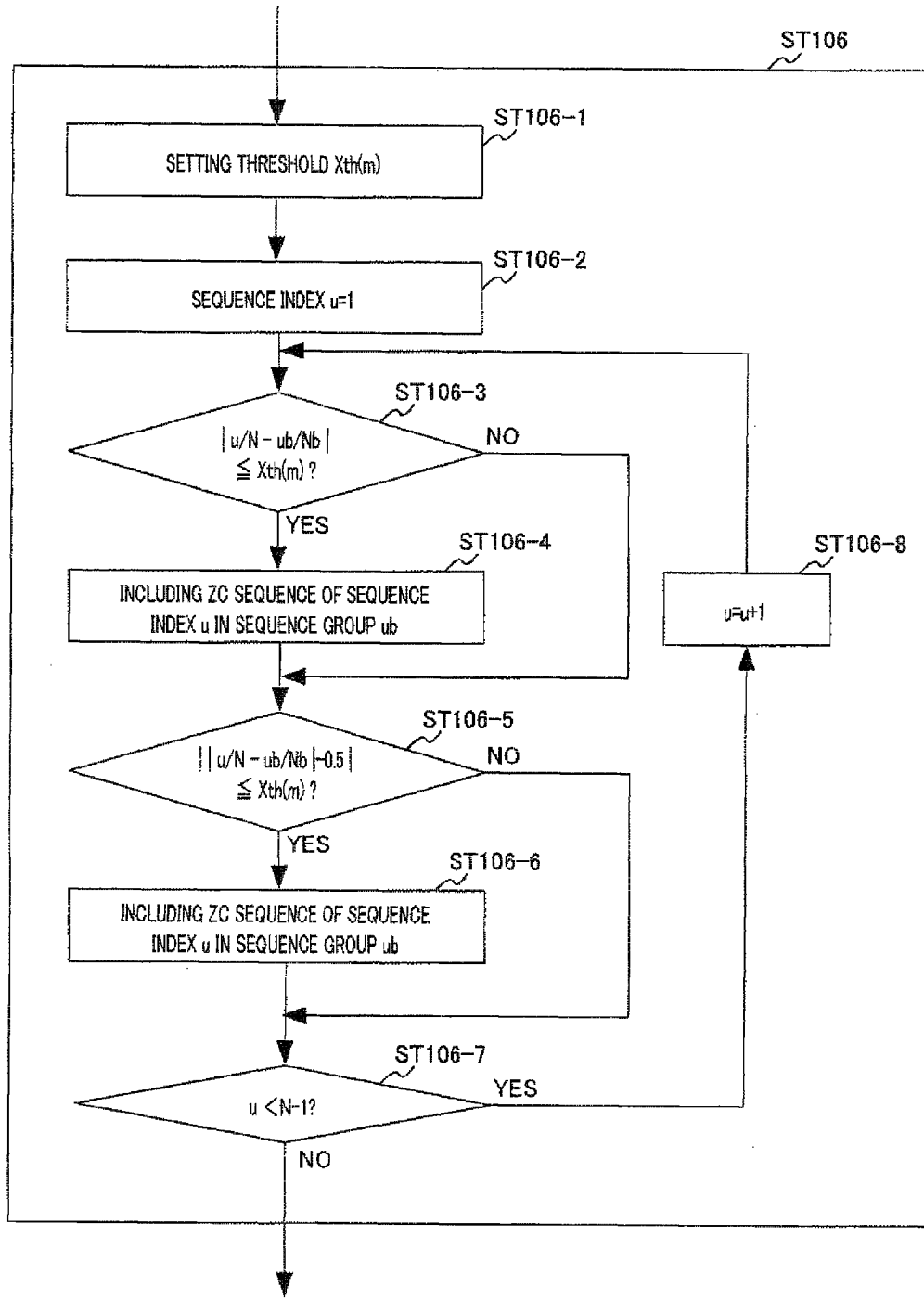
FIG. 9 is a flow chart showing a step of ST 106 in detail shown in FIG. 7.

Next, the steps in the above-described ST 106 will be explained in detail using FIG. 9. In FIG. 9, ST 106-1 sets up threshold value Xth(m) corresponding to the number of RBs, m. The method of threshold value Xth(m) setup will be described later.

ST 106-2 initializes sequence index u to be 1, and ST 106-3 decides whether or not u and N satisfy equation 5.

In equation 5, threshold value Xth(m) is set such that one or more sequences showing the difference from ub/Nb close to 0 can be selected. For example, threshold value Xth(m) is set as in equation 8.

$$Xth(m) = 1/(4Nb) \quad \text{(Equation 8)}$$

If ST 106-3 decides that u and N satisfy equation 5 ("YES"), the step moves to ST 106-4, and if ST 106-3 decides that u and N do not satisfy equation 5 ("NO"), the step moves to ST 106-5.

ST 106-4 includes, as ZC sequences used in m RBs, ZC sequences with sequence index u in sequence group ub and ST 106-5 decides whether or not u and N satisfies equation 9.

$$||u/N - ub/Nb| - 0.5| = Xth(m)$$ (Equation 9)

In equation 5, threshold value Xth(m) is set such that one or more sequences showing the difference from ub/Nb close to 0.5 can be selected. For example, threshold value Xth(m) is set as in equation 8.

If ST 106-5 decides that u and N satisfy equation 9 ("YES"), the step moves to ST 106-6, and if ST 106-5 decides that u and N do not satisfy equation 9 ("NO"), the step moves to ST 106-7.

ST 106-6 includes, as ZC sequences used in in RBs, ZC sequences with sequence index a in sequence group ub and ST 106-7 decides whether or not u<N−1. If ST 106-7 decides u<N−1 holds ("YES"), the step moves to ST 106-8, and, if ST 106-7 decides u<N−1 does not hold ("NO"), the process of ST 106 is finished and the step moves to ST 107.

ST 106-8 increments sequence index u by one like u=u+1, and the step returns to ST 106-3.

FIG. 10 shows sequence groups found in this way. Specifically, the sequence groups shown in FIG. 10 are acquired by the following conditions and steps. For example, to generate sequence group index=1 (group #1), ST 101 sets up Nb=31 and ub=1. Here, Nb=31 represents sequence length according to the number of RBs, m=3, and sequence index ub=1 corresponds to the sequence group index. The first bandwidth is set in a range of 3 RBs to 5 RBs in which the number of sequences is small, and a second bandwidth is set in a range of 6 RBs or more. Then, ST 105 selects a sequence showing the difference from ub/Nb closest to 0 using the above-described equation 5, and ST 106 selects sequences showing the difference from ub/Nb close to 0 and 0.5.

The conditions and steps to generate a sequence group index=2 (group #2) differs from a case where group #1 in setting up reference sequence index ub to be two in ST 101. Similar to sequence group indices 3 to 30 (group #3 to group #30), the value of sequence index ub set in ST 101 varies.

As an example of group #1 shown in FIG. 10, reference sequence length Nb=31 and reference sequence index ub=1. With the first bandwidth (3 RBs to 5 RBs), only one sequence showing the difference from ub/Nb the closest to 0, that is, a sequence of u=2 in RB #4 (N=47) and a sequence of u=2 in RB #5 (N=239) are included in one group. With the second bandwidth (6 RBs to 20 RBs), a plurality of sequences showing the difference from ub/Nb close to 0 and 0.5, that is, a sequence of u=2 and 38 in RB #6 (N=71) and a sequence of u=3, 47 and 48 in RB #8 (N=89) are included in one group.

Here, the boundary between the first bandwidth and the second bandwidth is determined such that the number of sequence groups (i.e. the number of sequences that can be generated in the reference RBs) does not decrease. Specifically, when the number of sequences that can be generated from RBs is divided by the number of sequence groups, the RBs having a quotient of 1, are set up in the first bandwidth and the RBs having a quotient of 2 or more are set up in the second bandwidth. In the case of sequence groups shown in FIG. 10, the number of sequence groups is 30 and the number of sequences generated from RB #5 is 58, and therefore the quotient by dividing the number of sequences by the number of sequence groups is 1. Further, the number of sequences generated from RB #6 is 70 and the quotient by dividing the number of sequences by the number of sequence groups is two, so that the boundary is between RB #5 and RB #6, RB #5 or less is set up as the first bandwidth and RB #6 or more is set up as the second bandwidth.

In this way, by selecting only one sequence for the first bandwidth of small numbers of RBs, it is possible to maintain the number of sequence groups. Further, by including in one group sequences showing the difference in u/N closest to 0 with the first bandwidth and sequences showing the difference in u/N close to 0 and 0.5 with the second bandwidth and by allocating the groups to one cell, so that it is possible to reduce the occurrence of significant cross-correlation between neighboring cells.

Figure 11:
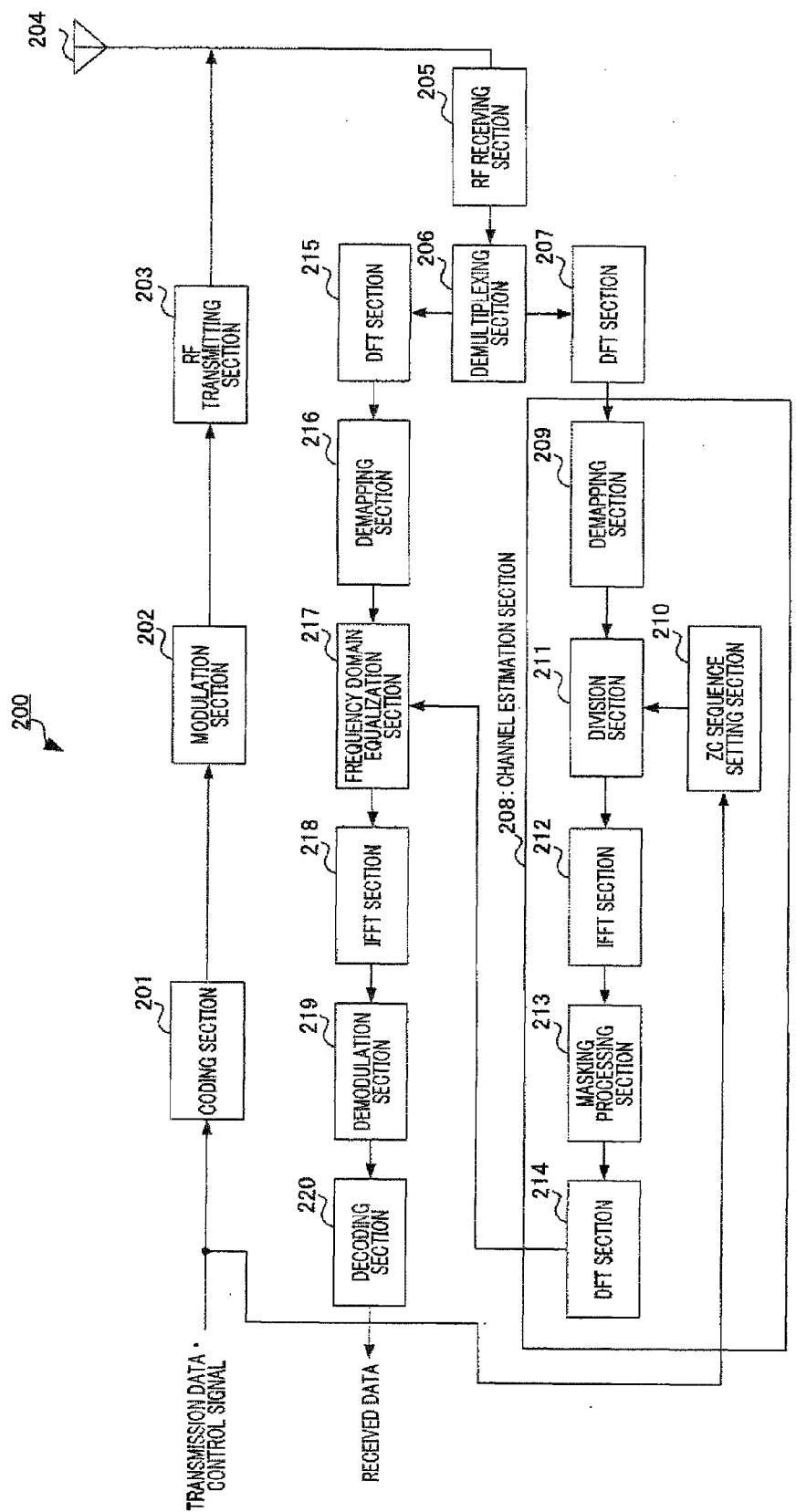
FIG. 11 is a block diagram showing the configuration of the base station according to Embodiment 1 of the present invention.

Next, a radio base station apparatus (hereinafter simply a "base station") located in a cell to which sequence groups generated according to the above-described sequence allocation method are allocated, will be explained. FIG. 11 is a block diagram showing the configuration of base station 200 according to Embodiment 1 of the present invention.

Coding section 201 encodes transmission data and a control signal for radio communication terminal apparatus 300 (hereinafter simply "terminal") located in the same cell as base station 200, and outputs coded data to modulation section 202. Here, the control signal contains reference sequence index ub corresponding to a sequence group index, and, for example, is transmitted to terminal 300 via a broadcast channel. Further, for example, the control signal contains scheduling information showing the transmission bandwidth, including the number of RBs allocated to terminal 300 or sequence length N, and the control signal containing this scheduling information is transmitted to terminal 300 via a control channel.

Modulation section 202 modulates the coded data outputted from coding section 201, and outputs the modulated signal to RE (radio frequency) transmitting section 203.

RF transmitting section 203 performs transmitting processing, including D/A conversion, up-conversion and amplification, on the modulated signal outputted from modulation section 202, and transmits the signal after the transmitting processing via antenna 204. In this way, base station 200 signals reference sequence index ub and the number of RBs, m, to terminal 300.

RF receiving section 205 performs receiving processing, including down-conversion and A/D conversion, on a signal received via antenna 204, and outputs the signal after the receiving processing to demultiplexing section 206.

Demultiplexing section 206 demultiplexes the signal outputted from RF receiving section 205 into the reference signal, data signal and control signal, and outputs the demultiplexed reference signal to DFT (discrete Fourier transform) section 207 and the data signal and control signal to DFT section 215.

DFT section 207 performs DFT processing on the reference signal outputted from demultiplexing section 206, transforms the time domain signal to a frequency domain signal, and outputs the frequency domain reference signal to demapping section 209 of channel estimation section 208.

Channel estimation section 208, which has demapping section 209, ZC sequence setting section 210, division section 211, and IFFT section 212, masking processing section 213 and DFT section 214, estimates channels based on the reference signal outputted from DFT section 207.

Demapping section 209 extracts ZC sequences corresponding to the transmission band of each mobile station 300 from the frequency-domain reference signal outputted from DFT section 207, and outputs the extracted ZC sequences to division section 211.

Based on reference sequence index ub and the number of RBs, m, allocated to terminals 300 contained in the input control signal, ZC sequence setting section 210 calculates ZC sequences used in terminals 300. The calculated ZC sequences are outputted to division section 211. ZC sequence setting section 210 will be described later in detail.

Division section 211 divides the ZC sequences corresponding to terminals 300 and outputted from ZC sequence setting section 210, by ZC sequences outputted from demapping section 209 and actually used in terminals 300, and outputs the division results to IFFT (Inverse Fast Fourier Transform) section 212.

IFFT section 212 performs IFFT processing on the division results outputted from division section 211, and outputs the signals after the IFFT processing to masking processing section 213.

By masking the signals outputted from IFFT section 212, masking processing section 213 extracts the correlation value in the period where the correlation value of the desired cyclic shift sequence is present, that is, extracts the correlation value of the window part, and outputs the extracted correlation value to DFT section 214.

DFT section 214 performs DFT processing on the correlation value outputted from masking processing section 213 and outputs the correlation value after the DFT processing to frequency domain equalization section 217. Here, the signal outputted from DFT section 214 represents the frequency response of the channel.

DFT section 215 performs DFT processing on the time-domain data signal and control signal outputted from demultiplexing section 206, transforms the time domain signals to frequency domain signals, and outputs the frequency-domain data signal and control signal, to demapping section 216.

Demapping section 216 extracts the data signal and control signal corresponding to the transmission band of each mobile station 300, from the signal outputted from DFT section 215, and outputs the extracted signals to frequency domain equalization section 217.

Frequency domain equalization section 217 equalizes the data signal and control signal outputted from demapping section 216 using the signal showing the frequency response of the channel outputted from DFT section 214 in channel estimation section 208, and outputs the signals after the equalization processing to IFFT section 218.

IFFT section 218 performs IFFT processing on the data signal and control signal outputted from frequency domain equalization section 217, and outputs the signal after the IFFT processing to demodulation section 219.

Demodulation section 219 demodulates the signal outputted from IFFT section 218, and decoding section 220 decodes the signal outputted from demodulation section 219, and extracts received data.

Figure 12:
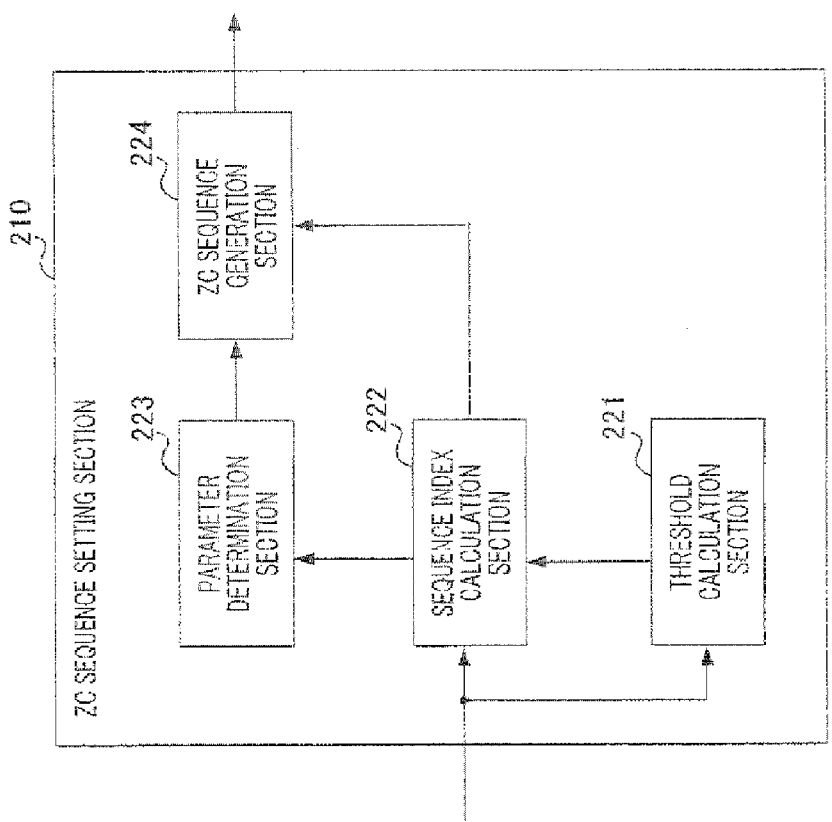
FIG. 12 is a block diagram showing the internal configuration of the ZC sequence setting section shown in FIG. 11.

FIG. 12 is a block diagram showing the internal configuration of ZC sequence setting section 210 shown in FIG. 11. In FIG. 12, threshold calculation section 221 uses equation 6 if m RBs included in the control signal received as input are set up in the first bandwidth, and uses equation 8 if m RBs are set up in the second bandwidth, to calculate threshold value Xth(m), and outputs the threshold value to sequence index calculation section 222.

Based on the number of RBs, m, included in the control signal received as input, sequence index calculation section 222 finds sequence lengths N of the ZC sequences that can be used as a reference signal, and outputs the sequence length to ZC sequence generation section 224. Further, based on the calculated sequence length N, reference sequence index ub included in the control signal received as input, reference sequence length Nb defined in advance, threshold value Xth(m) outputted from threshold calculation section 221, sequence index calculation section 222 calculates sequence indices u of ZC sequences that can be used as reference signals, and outputs the sequence indices to parameter determination section 223. This time, sequence indices u are calculated based on equation 5 when the ZC sequences are set up in the first bandwidth and are calculated based on equations 5 and 9 when the ZC sequences are set up in the second bandwidth.

Parameter determination section 223 selects one from sequence indices u that can be used and outputted from sequence index calculation section 222, and outputs the selected sequence index to ZC sequence generation section 224. For example, parameter determination section 223 selects a remainder given by dividing a frame number or slot number by the number of u's that can be used, that is, a result of modulo calculation of the frame number or slot number by the number of u's that can be used. Specifically, if four u's, u=a, b, c and d, that can be used are outputted from sequence index calculation section 222, parameter determination section 223 selects u=a when the result of modulo calculation of a frame number or slot number by 4 is 0, and selects u=b when the result is 1, selects u=c when the result is 2, and selects u=d when the result is 3. By this means, sequence hopping is made possible.

ZC sequence generation section 224 generates a ZC sequence based on equations 1 and 2 using sequence index u and sequence length N outputted from sequence index calculation section 222, and outputs the generated ZC sequence to division section 211.

Figure 13:
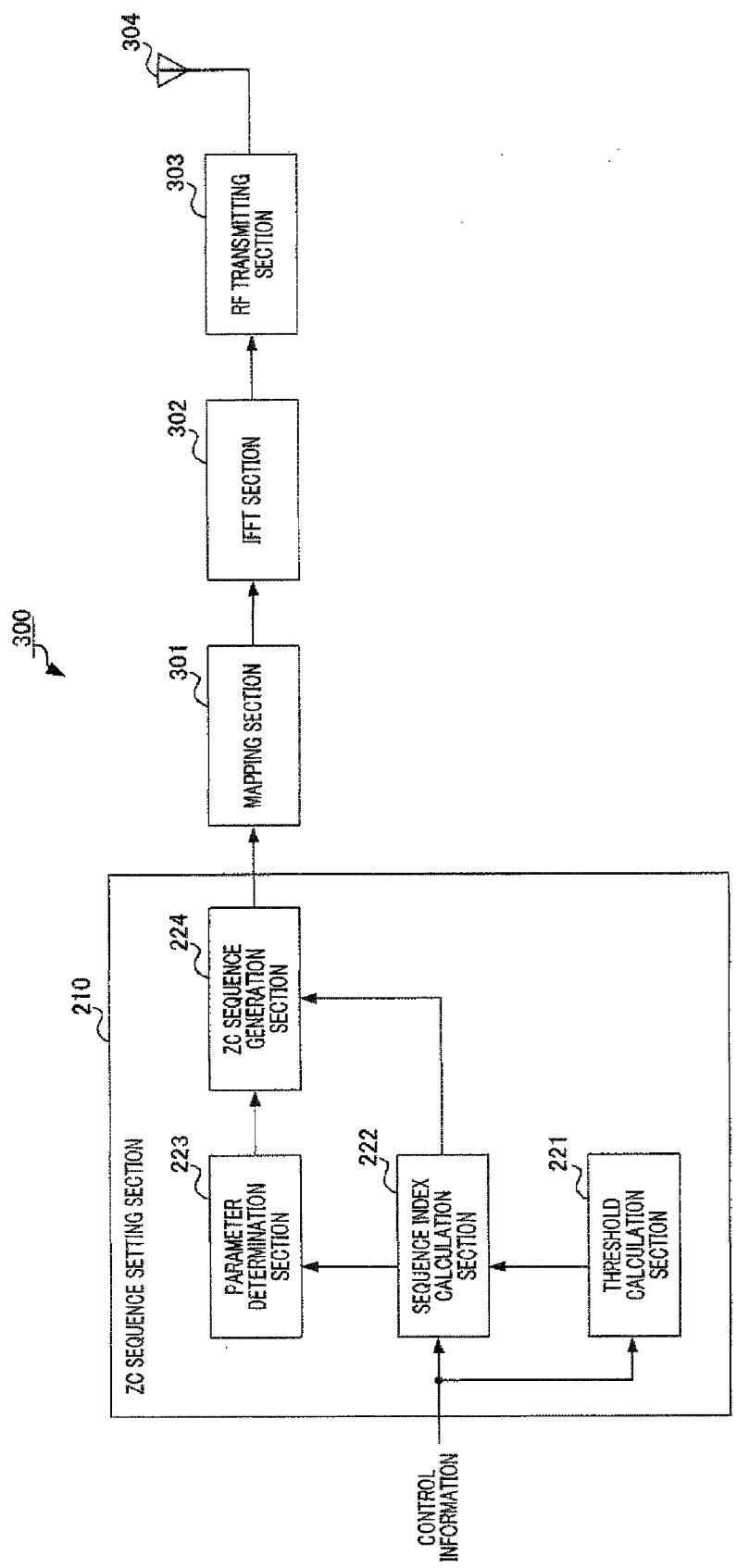
FIG. 13 is a block diagram showing the configuration of the terminal according to Embodiment 1 of the present invention.

Now, terminal 300 that generates ZC sequences used as a reference signal, using reference sequence index ub and the number of RBs, m, signaled from base station 200, will be explained. FIG. 13 is a block diagram showing the configuration of terminal 300 according to Embodiment 1 of the present invention. FIG. 13 omits the receiving system and only shows the transmission system of terminal 300.

In FIG. 13, ZC sequence setting section 210, which is similar to ZC sequence setting section 210 in base station 200, calculates a ZC sequence based on reference sequence index ub, the number of RBs, m and reference sequence length Nb defined in advance, and outputs the generated ZC sequence to mapping section 301.

Mapping section 301 maps the ZC sequence outputted from ZC sequence setting section 210 to the transmission band of terminal 300, and outputs the mapped ZC sequence to IFFT section 302.

IFFT section 302 performs an IFFT on the ZC sequence outputted from mapping section 301, and outputs the ZC sequence after the IFFT processing to RF transmitting section 303.

RF transmitting section 303 performs transmitting processing, including D/A conversion, up-conversion and amplification, on the ZC sequence outputted from IFFT section 302, and transmits the signal after the transmitting processing via antenna 304.

In this way, according to Embodiment 1, by selecting only one sequence in the first bandwidth, it is possible to maintain the number of sequence groups, and, by including in one sequence group sequences showing the difference in u/N closest to 0 in the first bandwidth and sequences between which the difference in u/N is 0 and 0.5 and by allocating different sequence groups per cell, it is possible to reduce the occurrence of significant cross-correlation between neighboring cells.

Although a case has been explained with the present embodiment as an example where sequence index calculation section 222 calculates sequence indices u that can be used using reference sequence index ub, reference sequence length Nb and the number of RBs, m, the present invention is not limited to this, and, when base station 200 and terminal 300 hold the sequence groups shown in FIG. 10 in the form of a table, sequence index calculation section 222 may find sequence indices u that can be used from the table. The method of determining sequence indices u using this table will be explained below. For example, the method presumes fixing reference signal length Nb, and tables are each prepared for two parameters, sequence length N and reference sequence index ub, and describe u's that can be selected. In this example, by receiving sequence length N and reference sequence index ub signaled from base station 200, and, with reference to an associated table, selecting one of written u's of alternative values, terminal 300 determines a ZC sequence that should be used as a reference signal.

Further, although a case has been described with the present embodiment as an example where parameter determination section 223 selects one of sequence indices u's that can be used based on the frame number or slot number, the present invention is not limited to this, and parameter determination section 223 may select one sequence index, for example, the minimum or maximum sequence index, according to a predetermined rule.

Further, by including sequences between which the difference in u/N is 0 and 0.5 in all bandwidths in one sequence group without separating the first bandwidth from the second bandwidth and by allocating different sequence groups per cell, it is equally possible to reduce the occurrence of significant cross-correlation between neighboring cells.

Embodiment 2

Figure 14:
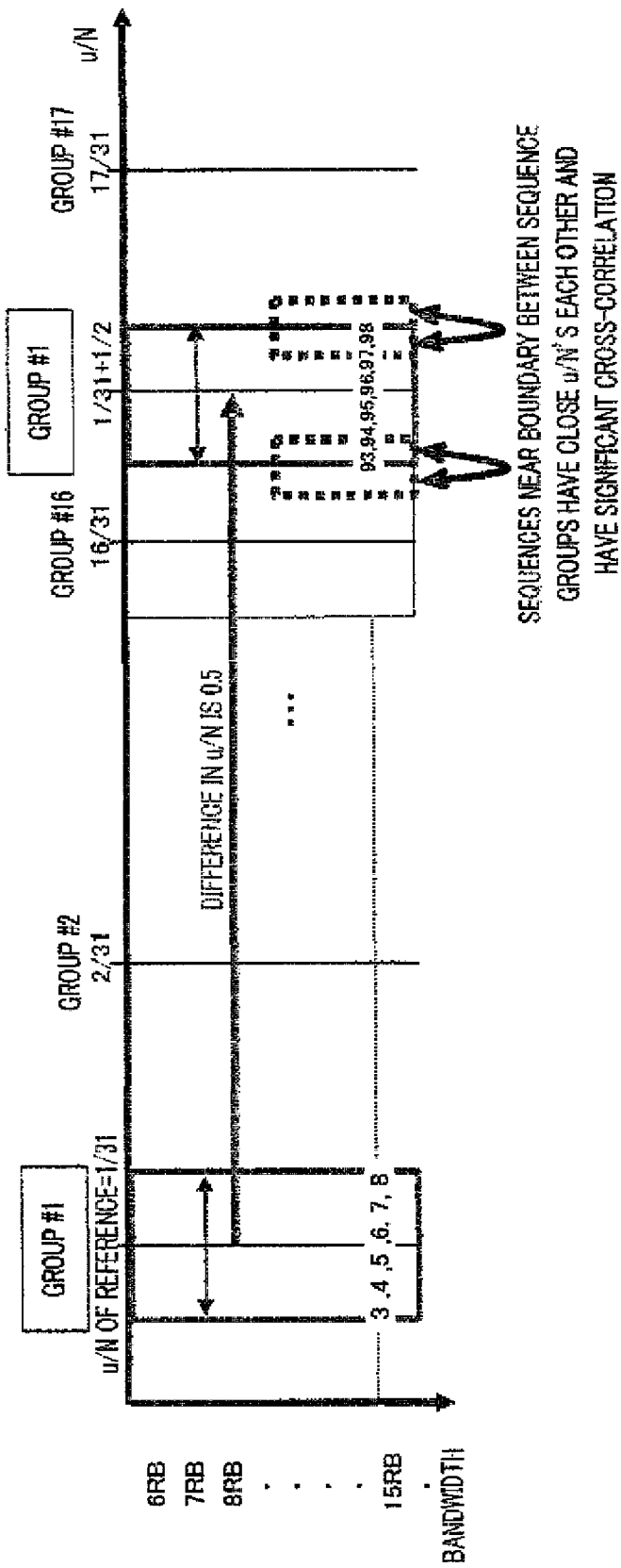
FIG. 14 is a schematic view showing the manner of increasing cross-correlation between different sequence groups.

With Embodiment 1, a sequence showing the difference between ub/Nb of a reference sequence and u/N close to 0 and 0.5 in a second bandwidth using the threshold value of equation 8. However, by fixing the threshold value for all bandwidths in this way, there is a problem that cross-correlation between different sequence groups increases and therefore interference from other cells increases. Specifically, as shown in FIG. 14, when the horizontal axis shows u/N and when sequences of 6 RBs or more are arranged on this horizontal axis, sequences showing the difference in u/N close to 0 are located near boundaries between different sequence groups, and these sequences are included in neighboring sequence groups. In particular, a wide bandwidth (RB) has a significant influence because the interval of u/N's decreases and there are a number of sequences.

Then, with Embodiment 2 of the present invention, a case will be explained about selecting sequences showing the difference in u/N from a predetermined reference closer to 0 and 0.5 in a second bandwidth when a bandwidth (RB) is wider.

The steps of the sequence allocation method according to Embodiment 2 of the present invention is the same as the steps shown in FIGS. 7 to 9 in Embodiment 1 and only differ in part of the steps in detail, and therefore the differences will be described using FIGS. 7 to 9.

In FIG. 9, ST 106-1 sets up two threshold values $Xth1(m)$ and $Xth2(m)$ as follows. Threshold value $Xth1(m)$ is set as a value for selecting $M_1$ sequences showing the difference from ub/Nb close to 0 in equation 5. For example, $Xth1(m)$ is set as equation 10.

$$Xth1(m)=\min(1/(2Nb),M_1/(2N)) \quad \text{(Equation 10)}$$

Threshold value $Xth2(m)$ is set as a value that can select $M_2$ sequences showing the difference from ub/Nb close to 0.5, in equation 9. For example, $Xth2(m)$ is set as in equation 11.

$$Xth2(m)=\min(1/(2Nb),M_2/(2N)) \quad \text{(Equation 11)}$$

ST 106-3 selects $M_1$ sequences showing the difference from ub/Nb close to 0 as in equation 12, using $Xth1(m)$ found in equation 10.

$$\|u/N-ub/Nb\|=Xth1(m) \quad \text{(Equation 12)}$$

ST 106-5 selects $M_2$ sequences showing the difference from ub/Nb close to 0 and 0.5 as in equation 13, using $Xth2(m)$ found in equation 11.

$$\|u/N-ub/Nb|-0.5\|=Xth2(m) \quad \text{(Equation 13)}$$

It is necessary to set up $M_1$ and $M_2$ so as not to overlap between different sequence groups. Specifically, the sum of $M_1$ and $M_2$ may only not exceed the value derived by dividing the number of ZC sequences in RBs by the number of sequence groups. For example, in RB #6, there are N−1=70 ZC sequences. If the number of sequence groups is 30, 70/30~2.3, and therefore the sum of $M_1$ and $M_2$ is required to be 2 or less.

FIG. 15 shows sequence groups found in this way. Specifically, the sequence groups shown in FIG. 15 are acquired by the following conditions and steps. For example, to generate sequence group index=1 (group #1), ST 101 sets up Nb=31 and ub=1. Here, Nb=31 represents sequence length according to the number of RBs, m=3, and sequence index ub=1 corresponds to the sequence group index. The first bandwidth is set in a range of 3 RBs to 5 RBs in which the number of sequences is small, and a second bandwidth is set in a range of 6 RBs or more. Then, ST 106-1 selects a sequence showing the difference from ub/Nb close to 0 and 0.5 using the above-described equations 10 and 11. In the second bandwidth, $M_1=M_2=1$ is set in RBs #6 to #10 and $M_1=M_2=2$ is set in RBs #12 or more.

Figure 16:
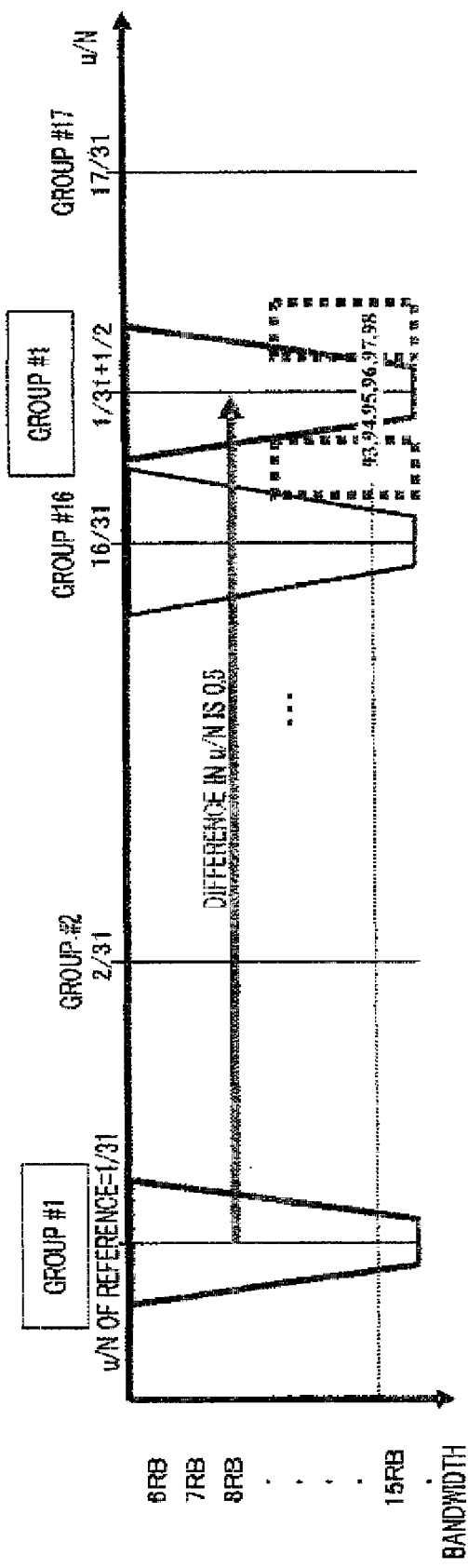
FIG. 16 shows how to reduce sequences having significant cross-correlation between different sequence groups.

As described above, as shown in FIG. 16, it is possible to reduce sequences of significant cross-correlation between different sequence groups in a second bandwidth.

In this way, according to Embodiment 2, when the bandwidth (RB) becomes significant in a second bandwidth, by selecting sequences showing the difference between ub/Nb of a reference sequence and u/N closer to 0 and 0.5, it is possible to reduce sequences of increased cross-correlation between different sequence groups.

Embodiment 3

With Embodiment 3 of the present invention, a case will be explained where more sequences showing the difference between ub/Nb of a reference sequence and u/N close to 0 are selected than sequences showing the difference close to 0.5 in the second bandwidth.

The sequence allocation method according to Embodiment 3 of the present invention differs from Embodiment 2 in the setting values of $M_1$ and $M_2$ used in equations 10 and 11 in Embodiment 2. Specifically, the sequence allocation method makes $M_1$, the number of selections of sequences showing the difference from ub/Nb close to 0, and $M_2$, the number of selections of sequences showing the difference from ub/Nb close to 0.5 have the relationships of equation 14. For example, in FIG. 15, $M_1=3$ and $M_2=1$ in #12 RBs or more.

$$M_1=M_2 \quad \text{(Equation 14)}$$

In this way, according to Embodiment 3, by including a greater number of sequences showing most significant correlation and showing the difference in u/N close to 0 in the same sequence group, it is possible to reduce the maximum value of cross-correlation while maintaining the number of sequence groups.

Embodiment 4

With Embodiment 4 of the present invention, a case will be explained where more sequences showing the difference between ub/Nb of a reference sequence and u/N close to 0.5 are selected than sequences showing the difference close to 0 in the second bandwidth.

The sequence allocation method according to Embodiment 3 of the present invention differs from Embodiment 2 in the setting values of $M_1$ and $M_2$ used in equations 10 and 11 in Embodiment 2. Specifically, the sequence allocation method makes $M_1$, the number of selections of sequences showing the difference from ub/Nb close to 0, and $M_2$, the number of selections of sequences showing the difference from ub/Nb close to 0.5 have the relationships of equation 15. For example, in FIG. 15, $M_1$=1 and $M_2$=3 in #12 RBs or more.

$$M_1 = M_2 \quad \text{(Equation 15)}$$

Figure 17:
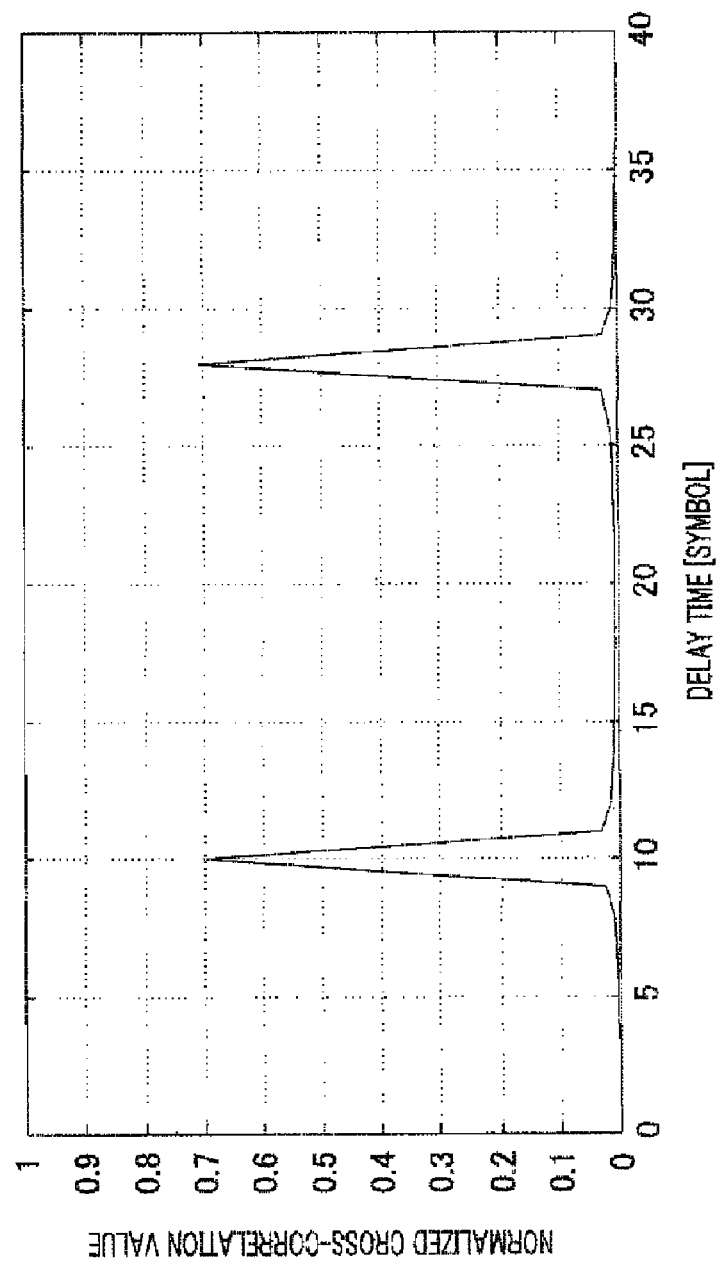
FIG. 17 shows cross-correlation characteristics between sequences showing a difference in u/N close to 0.5.

Here, although the maximum cross-correlation value of sequences showing the difference in u/N close to 0.5 is smaller than that of sequences showing the difference in u/N close to 0, a plurality of correlation peaks are produced. FIG. 17 shows cross-correlation characteristics between sequences showing the difference in u/N close to 0.5. Specifically, FIG. 17 shows cross-correlation characteristics between a ZC sequence of sequence length N=31 and sequence index u=4 and a ZC sequence of sequence length N=283 and sequence index u=178. In FIG. 17, the horizontal axis shows delay time using the number of symbols, the lateral axis shows a normalized cross-correlation value (the value obtained by dividing a cross-correlation value by signal energy). As shown in FIG. 17, it is found out that, in the cross-correlation performance between sequences showing the difference in u/N close to 0.5, a plurality of significant correlation peaks are produced.

When different terminals use cyclic shifted ZC (CS-ZC) sequences generated by cyclic-shifting a ZC sequence by a predetermined time length, a plurality of cross-correlation peaks have influence upon a plurality of terminals. Then, by setting a threshold value as in equation 15 and by including a larger number of sequences showing the difference in u/N close to 0.5, in the same sequence group, it is possible to reduce the occurrence of a plurality of significant correlation peaks.

In this way, according to Embodiment 4, by including a greater number of sequences showing the most significant correlation and showing the difference in u/N close to 0.5 in the same sequence group, it is possible to reduce the maximum value of cross-correlation while maintaining the number of sequence groups.

Combinations of the above-described embodiments may be implemented appropriately.

Although cases have been explained with the embodiments above as an example where sequence groups are generated using frequency domain ZC sequences, the present invention is not limited to this, and the sequence groups may be generated using time domain ZC sequences. A time-domain ZC sequence and a frequency-domain ZC sequence have relationships represented as in following equation 16.

$$(u \times r) \bmod(N) = N-1 \quad \text{(Equation 16)}$$

In equation 16, N represents the ZC sequence length, r represents the sequence index of the time-domain ZC sequence and u represents the sequence index of the frequency domain ZC sequence. Accordingly, when sequence groups are generated using time-domain ZC sequences, the ZC sequences showing the difference in u/N from the reference sequence smaller than a predetermined threshold value are found. The characteristic of a time domain ZC sequence and the characteristic of a frequency domain ZC sequence are the same, so that the same advantage is provided.

Further, although cases have been explained with embodiments above as an example where a ZC sequence is used as a reference signal for channel estimation, the present invention is not limited to this, and, a ZC sequence may be used as, for example, a reference signal for CQI estimation (a sounding RS), a synchronization channel, a random access preamble signal, a CQI signal or ACK/NACK signal.

Further, although cases have been explained with the embodiments above as an example where a ZC sequence is used as a reference signal transmitted from a terminal to a base station, the present invention is implemented in cases where a ZC sequence is used as a reference signal transmitted from a base station to a terminal.

Further, although cases have been explained with the embodiments above as an example where a ZC sequence is used, any sequence may be applied as long as a sequence includes a ZC sequence. For example, a GCL (Generalized Chirp-Like) sequence (c(k)) shown in equation 17 may be used.

[3]

$$c(k) = a(k)b(k \bmod m), k=0, 1, \ldots, N-1 \quad \text{(Equation 17)}$$

Sequence length N satisfies $N=sm^2$ (s and m are integers) or N=tm (t and m are integers), a(k) represents a ZC sequence represented by equation 1 or equation 2, and b(k) is a UFT sequence shown in equation 18.

[4]

$$b_i(k) = W_m^{ik}, i, k=0, 1, \ldots, m-1 \quad \text{(Equation 18)}$$

Further, either $M_1$ (the number of sequences selected showing the difference from ub/Nb close to 0) or $M_2$ (the number of sequences selected showing the difference from ub/Nb close to 0.5) may be set as 0.

Further, setting values of $M_1$ and $M_2$ may be changed by RBs. For example, $M_1=M_2$ is set up in predetermined RBs and sequences between which the difference in u/N is 0 and sequences between which the difference in u/N is 0.5 may be equally included in the same sequence group, and, as shown in Embodiment 3, $M_1=M_2$ is set up for RBs greater than predetermined RBs and a larger number of sequences showing the difference in u/N close to 0 may be included in the same sequence group.

As shown in FIG. 15, cross-correlation increases in combinations of sequences showing the difference in u/N close to 0.333 (=⅓) and the combinations of sequences are followed by the difference of 0 and the difference of 0.5. Accordingly, similar to the method according to Embodiment 2, sequences showing the difference close to 0.333 in addition to sequences showing the difference close to 0 and 0.5, may be included in the same sequence group in a second bandwidth. In this case, it is necessary to change the number of selected sequences showing the difference 0, 0.5 or 0.333, by sequence groups so that one sequence does not include in a plurality of sequences.

Further, although cases have been described with the above embodiment as examples where the present invention is configured by hardware, the present invention can also be realized by software.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology.

Application of Biotechnology is also Possible.

The disclosure of Japanese Patent Application No. 2007-311650, filed on Nov. 30, 2007, including the specification, drawings and abstract, is incorporated herein by reference in its entirety.

INDUSTRIAL APPLICABILITY

The sequence transmission method according to present invention is able to reduce cross-correlation between different sequence groups while maintaining sequence groups, and applicable to mobile communication systems, for example.

The invention claimed is:

1. A sequence transmission method comprising:
selecting a Zadoff-Chu sequence from one of (i) a first group including at least a first Zadoff-Chu sequence having (a sequence index of said first Zadoff-Chu sequence)/(a sequence length of said first Zadoff-Chu sequence) showing a difference from a reference Zadoff-Chu sequence having (a sequence index of said reference Zadoff-Chu sequence)/(a sequence length of said reference Zadoff-Chu sequence) closest to 0, and a second Zadoff-Chu sequence having (a sequence index of said second Zadoff-Chu sequence)/(a sequence length of said second Zadoff-Chu sequence) showing a difference from the reference Zadoff-Chu sequence having (the sequence index of said reference Zadoff-Chu sequence)/(the sequence length of said reference Zadoff-Chu sequence) closest to 0.5 and (ii) a second group including the first Zadoff-Chu sequence and not including the second Zadoff-Chu sequence; and
transmitting the selected Zadoff-Chu sequence, wherein:
in the event that the selected Zadoff-Chu sequence is transmitted using a first bandwidth, the Zadoff-Chu sequence is selected from the second group; and
in the event that the selected Zadoff-Chu sequence is transmitted using a second bandwidth greater than the first bandwidth, the Zadoff-Chu sequence is selected from the first group.

2. The sequence transmission method according to claim 1, wherein the first group includes more Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

3. The sequence transmission method according to claim 1, wherein the first group includes less Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

4. A transmission apparatus comprising:
a sequence setting section configured to select a Zadoff-Chu sequence from one of (i) a first group including at least a first Zadoff-Chu sequence having (a sequence index of said first Zadoff-Chu sequence)/(a sequence length of said first Zadoff-Chu sequence) showing a difference from a reference Zadoff-Chu sequence having (a sequence index of said reference Zadoff-Chu sequence)/(a sequence length of said reference Zadoff-Chu sequence) closest to 0, and a second Zadoff-Chu sequence having (a sequence index of said second Zadoff-Chu sequence)/(a sequence length of said second Zadoff-Chu sequence) showing a difference from the reference Zadoff-Chu sequence having (the sequence index of said reference Zadoff-Chu sequence)/(the sequence length of said reference Zadoff-Chu sequence) closest to 0.5 and (ii) a second group including the first Zadoff-Chu sequence and not including the second Zadoff-Chu sequence; and
a transmitter configured to transmit the selected Zadoff-Chu sequence, wherein:
in the event that the selected Zadoff-Chu sequence is transmitted using a first bandwidth, the Zadoff-Chu sequence is selected from the second group; and
in the event that the selected Zadoff-Chu sequence is transmitted using a second bandwidth greater than the first bandwidth, the Zadoff-Chu sequence is selected from the first group.

5. The transmission apparatus according to claim 4, wherein the first group includes more Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

6. The transmission apparatus according to claim 4, wherein the first group includes less Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

7. A reception apparatus comprising:
a sequence setting section configured to select a Zadoff-Chu sequence from one of (i) a first group including at least a first Zadoff-Chu sequence having (a sequence index of said first Zadoff-Chu sequence)/(a sequence length of said first Zadoff-Chu sequence) showing a difference from a reference Zadoff-Chu sequence having (a sequence index of said reference Zadoff-Chu sequence)/(a sequence length of said reference Zadoff-Chu sequence) closest to 0, and a second Zadoff-Chu sequence having (a sequence index of said second Zadoff-Chu sequence)/(a sequence length of said second Zadoff-Chu sequence) showing a difference from the reference Zadoff-Chu sequence having (the sequence index of said reference Zadoff-Chu sequence)/(the sequence length of said reference Zadoff-Chu sequence) closest to 0.5 and (ii) a second group including the first Zadoff-Chu sequence and not including the second Zadoff-Chu sequence; and a channel estimator configured to perform channel estimation using the selected Zadoff-Chu sequence, wherein in the event that the selected Zadoff-Chu sequence is used to perform the channel estimation with a reference signal transmitted using a first bandwidth, the Zadoff-Chu sequence is selected from the second group; and in the event that the selected Zadoff-Chu sequence is used to perform the channel estimation with a reference signal transmitted using a second bandwidth greater than the first bandwidth, the Zadoff-Chu sequence is selected from the first group.

8. The reception apparatus according to claim 7, wherein the first group includes more Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

9. The reception apparatus according to claim 7, wherein the first group includes less Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

10. A channel estimation method comprising:

selecting a Zadoff-Chu sequence from one of (i) a first group including at least a first Zadoff-Chu sequence having (a sequence index of said first Zadoff-Chu sequence)/(a sequence length of said first Zadoff-Chu sequence) showing a difference from a reference Zadoff-Chu sequence having (a sequence index of said reference Zadoff-Chu sequence)/(a sequence length of said reference Zadoff-Chu sequence) closest to 0, and a second Zadoff-Chu sequence having (a sequence index of said second Zadoff-Chu sequence)/(a sequence length of said second Zadoff-Chu sequence) showing a difference from the reference Zadoff-Chu sequence having (the sequence index of said reference Zadoff-Chu sequence)/(the sequence length of said reference Zadoff-Chu sequence) closest to 0.5 and (ii) a second group including the first Zadoff-Chu sequence and not including the second Zadoff-Chu sequence; and performing channel estimation using the selected Zadoff-Chu sequence, wherein:

in the event that the selected Zadoff-Chu sequence is used to perform the channel estimation with a reference signal transmitted using a first bandwidth, the Zadoff-Chu sequence is selected from the second group; and when the selected Zadoff-Chu sequence is used to perform the channel estimation with a reference signal transmitted using a second bandwidth greater than the first bandwidth, a Zadoff-Chu sequence is selected from the first group.

11. The channel estimation method according to claim 10, wherein the group includes more Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

12. The channel estimation method according to claim 10, wherein the group includes less Zadoff-Chu sequences having (the sequence index)/(the sequence length) showing the difference from the reference Zadoff-Chu sequence having (the sequence index)/(the sequence length) closer to 0 than to 0.5 than Zadoff-Chu sequences having (the sequence index)/(the sequence length) showing the difference from the reference Zadoff-Chu sequence having (the sequence index)/(the sequence length) closer to 0.5 than to 0.

* * * * *